United States Patent [19]
Yu et al.

[11] Patent Number: 5,667,911
[45] Date of Patent: Sep. 16, 1997

[54] METHODS OF MAKING CROSS-PLY MICROPOROUS MEMBRANE BATTERY SEPARATOR, AND THE BATTERY SEPARATORS MADE THEREBY

[75] Inventors: Wei-Ching Yu; Carlton F. Dwiggins, both of Charlotte, N.C.

[73] Assignee: Hoechst Celanese Corporation, Somerville, N.J.

[21] Appl. No.: 362,048

[22] Filed: Dec. 22, 1994

Related U.S. Application Data

[63] Continuation-in-part of Ser. No. 341,239, Nov. 17, 1994, abandoned.

[51] Int. Cl.$^6$ .................................................. H01M 2/18
[52] U.S. Cl. ...................... 429/144; 429/145; 429/247; 29/623.1
[58] Field of Search .................................. 429/144, 145, 429/247, 249; 29/623.1, 623.4; 264/45.8, 45.9

[56] References Cited

U.S. PATENT DOCUMENTS

| | | | |
|---|---|---|---|
| 1,955,282 | 4/1934 | Gardner et al. | 164/65 |
| 2,110,856 | 3/1938 | Gardner et al. | 164/65 |
| 2,644,522 | 7/1953 | Parker et al. | 164/65 |
| 3,558,764 | 1/1971 | Isaacson et al. | 264/210 |
| 3,679,538 | 7/1972 | Druin et al. | 161/159 |
| 3,843,761 | 10/1974 | Bierenbaum et al. | 264/210 R |
| 3,853,601 | 12/1974 | Taskier | 117/98 |
| 4,078,123 | 3/1978 | Costenoble | 429/141 |
| 4,078,124 | 3/1978 | Prentice | 429/144 |
| 4,439,260 | 3/1984 | Canterino et al. | 156/259 |
| 4,640,730 | 2/1987 | Lundquist et al. | 429/62 |
| 4,731,304 | 3/1988 | Lundquist et al. | 429/62 |
| 4,809,413 | 3/1989 | Upmeier | 29/2.18 |
| 4,907,323 | 3/1990 | Smith et al. | 29/2.21 |
| 5,248,366 | 9/1993 | Rasmussen | 156/259 |
| 5,350,471 | 9/1994 | Planeta | 156/156 |

FOREIGN PATENT DOCUMENTS

| | | |
|---|---|---|
| 57-203516 | 12/1982 | Japan . |
| 59-12559 | 1/1984 | Japan . |
| 59-173948 | 10/1984 | Japan . |
| 63-072063 | 4/1988 | Japan . |
| 63-72063 | 4/1988 | Japan . |
| 816607 | 7/1959 | United Kingdom . |

*Primary Examiner*—Prince Willis, Jr.
*Assistant Examiner*—Carol Chaney
*Attorney, Agent, or Firm*—R. H. Hammer, III

[57] ABSTRACT

Continuous seamless cross-plied battery separators are formed by bringing at least two anisotropic with respect to mechanical strength (e.g. uniaxially oriented), microporous plies into adhering face contact such that the uniaxial orientation of one microporous ply is angularly biased relative to the other microporous ply (e.g., between 20° to 90°). This biased relationship between the microporous plies is most preferably achieved by spirally or helically slitting a tubular microporous membrane. The plies are adhered to one another with adhesive and/or by means of heat and pressure. The cross-plied battery separators of this invention exhibit increased puncture strength without significant decrease in permeability. As a result, the battery separators of this invention are especially useful in battery cell configurations whereby the battery separator is sandwiched between anode and cathode sheets to form a composite battery cell structure which is then rolled or folded to be placed in a battery cell can.

7 Claims, 2 Drawing Sheets

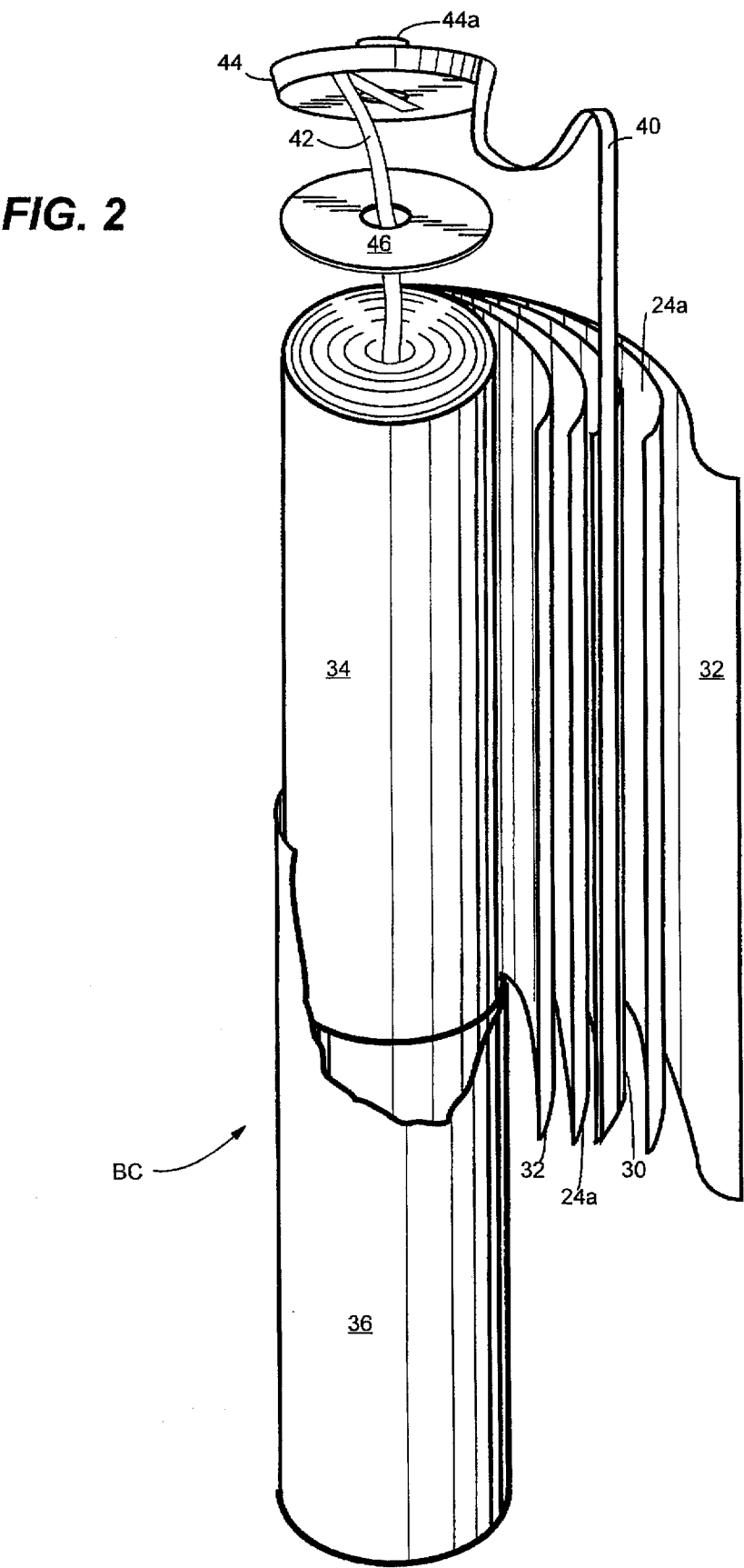

METHODS OF MAKING CROSS-PLY MICROPOROUS MEMBRANE BATTERY SEPARATOR, AND THE BATTERY SEPARATORS MADE THEREBY

This is a continuation-in-part of application Ser. No. 08/341,239 filed Nov. 17, 1994, and abandoned.

FIELD OF INVENTION

This invention relates to generally to membrane battery separators.

BACKGROUND OF THE INVENTION

Electrochemical batteries have for some time been used as a means to power a variety of electronic consumer products. In this regard, conventional batteries are usually of the type having an anode, a cathode, a porous separator to maintain physical separation between the anode and cathode, and a suitable electrolyte supplying a source of positive and negative ions which migrate between the anode and cathode during use.

The separator that is employed in electrochemical batteries should exhibit several desirable functional attributes. For example, the separator must be sufficiently porous or permeable to allow ion migration between the anode and cathode during use. The separator must be sufficiently thin to allow sufficient active material to be placed in the battery to achieve the desired capacity. Finally, from a battery manufacturing process point of view, the separator must have sufficient puncture strength to resist penetration and damage from the electrodes (such electrodes may have rough surfaces), which would lead to internal shorts and high scrap rates in production. This necessary balance of properties (i.e., high porosity and puncture strength in a thin separator) is often difficult to achieve.

In addition, for high energy lithium battery systems, it is also desirous that the separator provide a shutdown function. This is defined as a decrease in porosity to an extent that an uncontrolled reaction of potentially explosive magnitude is prevented from occurring. This should occur at some temperature well below the melting and/or ignition point of lithium. Membranes made of polypropylene (PP) will shutdown, but the melting point of PP (~165° C.) is too near the melting point of lithium. Therefore, membranes made of polyethylene (PE) (with a melting point of (~135° C.)) are preferred. However, PE membranes tend to have lower puncture strengths than PP membranes of similar thickness.

The use of microporous membranes as battery separators either as single plies or as laminates is well known. In this regard, microporous membranes disclosed in U.S. Pat. Nos. 3,558,764 to Issacson et al, 3,843,761 to Beirnbaum et al., and 3,679,538 to Druin et al (the entire content of each such U.S. Patent being incorporated expressly hereinto by reference) have been commercialized for battery separators and other applications by Hoechst Celanese Corporation under the registered trademark Celgard®. In general, these patents disclose single ply microporous polyolefin membranes.

U.S. Pat. Nos. 4,650,730 and 4,731,304 each to Lundquist et al (the entire content of each such U.S. Patent being incorporated expressly hereinto by reference) disclose sheet products said to be useful as battery separators which have at least two microporous plies which are coextensively bonded together to form a unitary sheet product. When subjected to elevated temperatures (as when shorting occurs in a battery due to abuse or for other reasons), one of the plies is intended to melt and transform into a non-porous membrane, thus shutting down the current flow and the battery.

Recently, cross-plied microporous membrane separators for use in so-called button cell lithium cathode batteries have been proposed as evidenced in Japanese Patent Application (Kokai) Nos. 59-12559, 63-72063 and 59-173948. Each of these Japanese Patent Publications generally disclose relatively small circular-shaped battery separators for use in button cell batteries, whereby the separators include two microporous membrane plies which maybe laminated to one another such that the axis of one ply is angularly biased (preferably orthogonal) relative to the axis of the other ply. The disclosed process for forming such button cell cross-plied microporous membrane separators generally includes superposing one sheet of microporous membrane over another sheet of microporous membrane so that the axes are angularly biased, and then punching or stamping the circular-shaped separator from the superposed microporous membrane sheets.

The cross-plying of microporous membrane sheets could have benefits for non-button cell batteries in terms of increased strength (puncture resistance). For example, cylindrical or rectangular battery cell constructions requiring a continuous separator sheet whose length is substantially greater than the effective cell diameter (i.e., so that the separator sheet may seamlessly be rolled or generally sinusoidally folded between anode and cathode layers) could benefit from the increased strength and puncture-resistance properties that cross-plied microporous membrane separators may provide. In addition to such increased strength and puncture-resistance properties, at least one of the cross-plied microporous membrane layers could be formed of a relatively low melt-point polymer and thus provide a thermal fuse to stop uncontrolled electrochemical reactions from occurring within the cell.

To date, however, the art has not proposed any means by which a continuous seamless sheet formed of cross-plied microporous membranes could be fabricated. It is towards supplying such a need that the present invention is directed.

SUMMARY OF THE INVENTION

Broadly, the present invention is directed toward continuous seamless battery separators and methods of making the same. More specifically, the present invention is embodied in continuous seamless battery separators whereby at least two layers of microporous membranes are adhered to one another in face contact such that one layer is angularly oriented relative to the other layer.

The continuous cross-plied microporous membrane separators of this invention are more specifically formed by providing at least two microporous polymeric plies which are anisotropic with respect to mechanical strength (e.g., uniaxially oriented). At least one, and preferably both, such plies are preferably initially in the form of a uniaxially oriented (e.g., in the machine direction) tubular membrane which is spirally slit at a desired angle such that the uniaxial orientation of the plies are likewise biased relative to the plies' longitudinal (or machine direction, MD) axis. These plies may then be brought into adhering face contact with one another so as to achieve a cross-ply effect—that is, the uniaxial orientation of the plies will be angularly biased relative to one another (e.g., between 20° to 90°). The cross-plied battery separators of this invention are especially useful in battery cell configurations whereby the battery sheet is interposed between anode and cathode sheets to form a composite battery cell structure which is then rolled or folded to be placed in a battery cell can of cylindrical or rectangular geometry.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various FIGURES denote like structural elements, and wherein;

FIG. 2 is a side perspective view, partly in section, of a representative battery cell in which the cross-plied microporous membrane separator of this invention may be used.

DETAILED DESCRIPTION OF THE PREFERRED EXEMPLARY EMBODIMENTS

Figure 1:
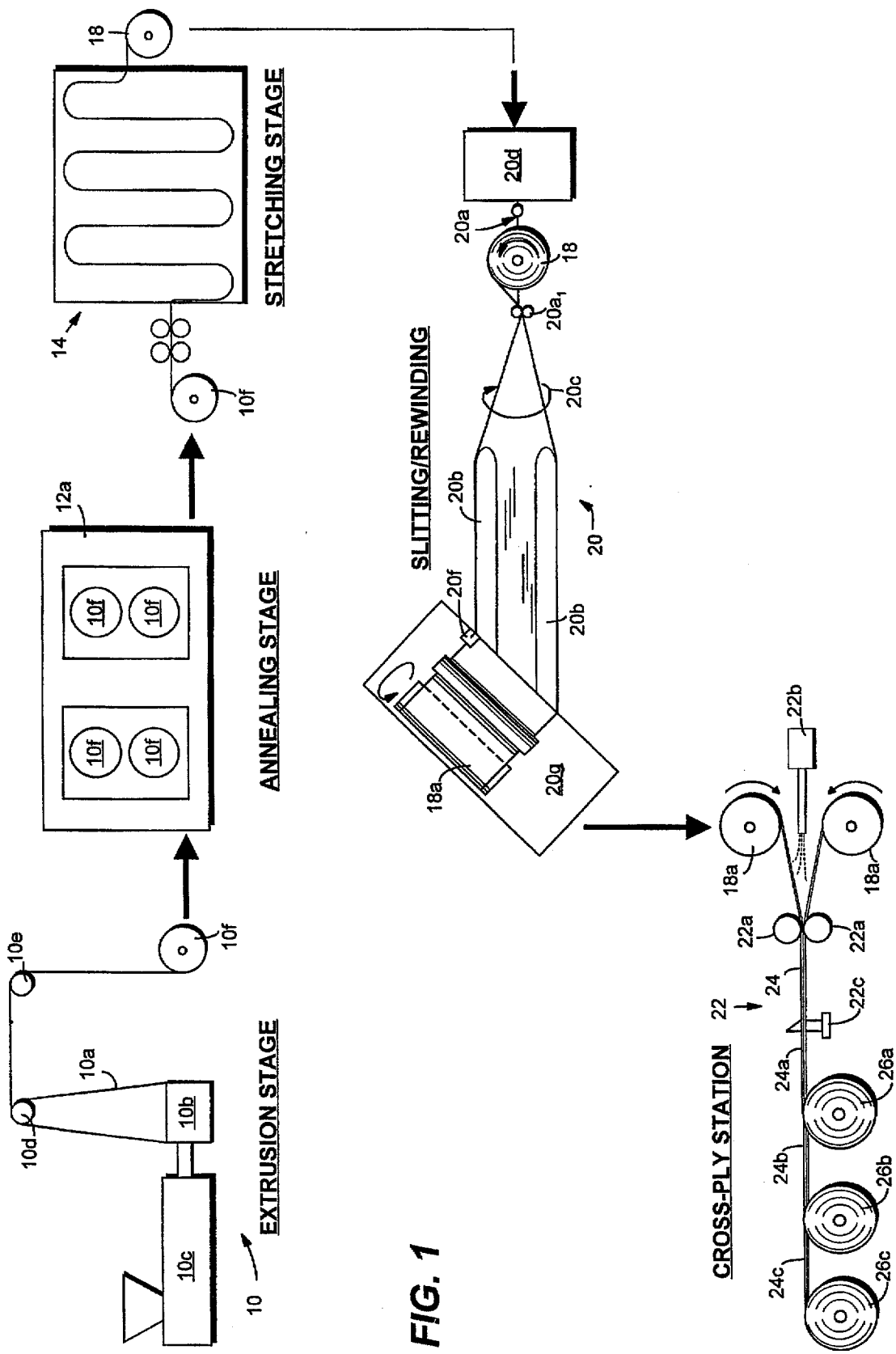
FIG. 1 is a schematic flow diagram showing the process steps employed to produce the cross-plied microporous membrane battery separators according to this invention.

As noted briefly above, the present invention is especially characterized by a multilayer cross-plied microporous membrane separator which is continuous and seamless. By the term "continuous" is meant that the separator sheet according to the present invention has lengthwise dimension which is substantially greater than the effective diameter of the battery cell in which the separator sheet is used. By "effective diameter" is meant the smallest cross-sectional dimension of the battery cell. Therefore, cylindrical battery cells will have an effective diameter which is the actual cross-sectional diameter of the cylinder, whereas non-cylindrical battery cells will have an effective diameter which is the latitudinal cross-sectional dimension. Preferably, the length of the separator sheet according to the present invention will have a ratio of length dimension to the effective diameter of the battery cell ($L/D_e$) of at least about 2.5.

The battery separators of this invention will necessarily include at least two plies of microporous membranes, the plies being laminated together. At least one, and preferably both of these plies must be anisotropic with respect to mechanical strength. With the foregoing proviso, virtually any microporous membrane formed by conventional membrane-manufacturing processes (e.g., solvent stretching, sequential cold/hot stretching, solvent casting, and the like) may be employed in the practice of this invention. Preferably, the anisotropic properties (e.g., tensile properties) may be formed by uniaxial orientation, however, the invention is not so limited. Most preferred, however, are microporous membranes and laminates made therefrom according the process exemplified in accompanying FIG. 1.

As can be seen from accompanying FIG. 1, the microporous membrane is prepared generally utilizing an extrusion stage 10, an annealing stage 12, and a stretching stage 14. The extrusion stage 10 involves extruding a tubular non-porous film parison 10a using a circular extrusion die 10b associated with a conventional polymer extruder 10c. Air is introduced upwardly through the extrusion die so as to form the parison 10a (i.e., so-called "blown film extrusion"). The parison 10a is collapsed using rollers 10d, 10e and collected as a roll 10f. The preferred polymer from which the non-porous precursor film is made is most preferably an olefinic resin, e.g., polypropylene or polyethylene. However, other resins may also be employed depending, for example, upon the particular battery components with which the separators of this invention are intended to be used.

The roll 10f is then annealed during the annealing stage 12 in an annealing or heat-treating oven 12a. The annealing stage 12 serves to increase the size of the crystallites and remove imperfections therein. Generally, annealing is carried out at a temperature in the range of between about 5° C. to 100° C. below the melting point of the polymer for a period of a few seconds to several hours (e.g., 5 seconds to 24 hours, and more preferably from about 30 seconds to 2 hours). As a further example, when polypropylene is the polymer from which the non-porous film is made, the preferred annealing temperature is in the range of between about 100° C. and 155° C.

Following the annealing stage, the annealed non-porous film 10f is ready for processing in the stretching stage to form micropores therein and to impart the uniaxial orientation. In this regard, the stretching stage involves generally the sequential steps of cold stretching, followed by sequential hot stretching of the starting non-porous film as is more fully described in the Isaacson et al '764, Biernbaum et al '761, and Druin et al '538 patents cited above. The resulting microporous membrane material (which is still in the form of a collapsed parison) is retrieved at the end of the stretching stage 14 in the form of a roll 18.

The pores of the microporous membrane material forming roll 18 are essentially interconnected through tortuous paths which may extend from one exterior surface or surface region to another (i.e., open-celled). The microporous membrane will thus exhibit a reduced bulk density as compared with the density of their corresponding precursor film having no open-celled structure. In this regard, the microporous membranes will typically have a bulk density of no greater than about 95%, and usually between about 50% and 70% of the starting non-porous precursor film.

The pores of the microporous membrane are, moreover, microscopic—i.e., the details of the pore configuration or arrangement are described only in terms of microscopic dimensions. Thus, the open cells or pores in the membranes are smaller than those which can be measured using an ordinary light microscope, because the wavelength of visible light, which is about 5,000 Å, is longer than the longest planar or surface dimension of the open cell or pore. The pore size of the microporous membranes may be defined by using electron microscopy techniques which are capable of resolving details of pore structure below 5,000 Å or by mercury porosimitry techniques.

The average effective pore size of the microporous membranes useable in the battery separators of this invention is preferably between 50 to 5,000 Å, and more typically between 150 to 5,000 Å. By "average effective pore size" is meant the smallest dimension of a pore which would allow a generally spherical particle of that same dimension to pass therethrough. The pores generally are defined by a plurality of elongated, non-porous, interconnecting surface regions which have their axes of elongation substantially parallel to each other, and substantially normal or perpendicular to the direction in which the film was stretched during the stretching stage 14. Substantially alternating with and defined by the non-porous regions is a plurality of elongated, porous surface regions which contain a plurality of parallel fibrils. The fibrils are connected at each of their ends to a non-porous region, and are substantially perpendicular with respect to such non-porous regions. Between the fibrils are the pores which thus have an elongated shape with a width of from about 50 to 5,000 Å and a length of from about 500 to 10,000 Å. Hence, the "average effective pore size" will be determined by the width dimension of the pores.

As can be appreciated, therefore, the membrane from forming roll 18 is uniaxially oriented in the stretching (machine) direction during the stretching step 14. According to this invention, such uniaxial orientation of the roll is biased relative to the lengthwise direction of the membrane using a bias or spiral slitting/rewinding station 20. In this regard, the preferred slitting/rewinding station is, in and of itself conventional. Apparatus that may be employed in the practice of this invention include those described or shown in U.S. Pat. Nos. 5,248,366 to Rasmussen, 4,907,323 to Smith et al, 4,439,260 to Canterino et al, 4,809,413 to Upmeier, 2,644,522 to Parker et al, 2,110,856 and 1,955,282 to Gardner et al, 1,753,645 to Camfield, 1,365,485 to Bunker, and Russian Patent No. 499364 (the entire content of each such U.S. Patent being incorporated expressly hereinto by reference). A commercially available apparatus that is suitable for use as the slitting/rewinding station 20 is the Series 2001K Biaser/Winder available from Judelshon Industries, a Division of John Dusenbery Co., Inc.

The roll of uniaxially oriented microporous collapsed tubular membrane 18 obtained from the stretching step 14 is supported by unwinding supports 20a. The roll 18 of microporous membrane is thus unwound at the slitting/ rewind station 20 in axial opposition to support mandrels 20b associated with the rewinding station. A flow of air in axial opposition to the tubular membrane being unwound from roll 18 should be employed so as to assist in opening of the tubular membrane. The opened uniaxially oriented tubular membrane supported by mandrels 20b, as well as the unwind frame 20a which supports the roll 18, are collectively rotated (arrow 20c) about the axis of the mandrel 20b by means of unwind motor 20d as the tubular membrane advances to the cutting station 20f. The inflated tubular membrane is cut by a knife or blade (not shown) at position 20f, which is fixed relative to the mandrels 20b at a desired angle relative to the mandrel axis (e.g., 30° to 60°). The cut sheet is pulled from the mandrels 20b at the same angle as the cut at position 20f by a winding unit 20g and is wound into a roll 18a. As can be appreciated, the membrane wound onto roll 18a will be oriented at a bias relative to the longitudinal axis of the film which is commensurate with the bias at which the tubular film was cut at position 20f.

It has been found that, if the interply adhesion in the uniaxially oriented microporous collapsed tubular membrane 18 obtained from the stretching step 14 is greater than about 5 gm/in, the tubular membrane needs to be preopened before being directed to the slitting/rewinding station 20—an acceptable, but not preferred, situation. Preopening could be accomplished on a separate piece of equipment, or by trapping an air bubble between the roll 18 and the nip rollers 20a$_1$ (or "S" wrapping) associated with the support 20a. It is preferred that the interply adhesion in the uniaxially oriented microporous collapsed tubular membrane 18 obtained from the stretching step 14 be less that about 5 gm/in so as to avoid preopening of the tubular membrane in advance of the slitting/rewinding station 20.

At least two sheets of microporous membrane may now be cross-ply laminated to one another in order to form the continuous battery separators according to the present invention. Preferably, each of the membrane layers forming the battery separator will have been formed from the slitting/ rewinding station 20. That is, each of the layers of microporous membrane forming the separator according to this invention will exhibit anisotropic mechanical properties which are angularly biased relative to the elongate axis of the membrane and will, moreover, be laminated one to another in face contact such that the orientations of the membrane layers are respectively angularly biased (i.e., cross-plied).

As shown in FIG. 1, the cross-ply station 22 is supplied with microporous membrane unwound from at least two of the rolls 18a obtained from the slitting/rewinding station 20 in such a manner that the angular bias of one of the membranes is offset relative to the angular bias of the other membrane. However, if desired, only one of the membranes being unwound at the cross-ply station 22 needs to have orientation at an angular bias relative to the elongate direction of the membrane, while the other membrane could have an orientation parallel to the membrane's elongate axis (i.e., a conventional machine direction oriented membrane sheet). The resulting laminated membrane would thereby still have the orientation of each layer angularly oriented relative to one another, albeit at a lesser angle. Suffice it to say, that the principles embodied in the present invention may be used and/or modified to obtain a laminated multiply microporous battery separator whereby the orientation of the individual layers are angularly biased relative to one another at virtually any desired angle.

In any event, the microporous membrane is unwound from each of the rolls 18a in face to face relationship in order to ensure an angular bias is established between the two membrane layers. That is, the technical face of one membrane layer is brought into contact with the technical face of the other membrane layer so that the angular bias of the membrane is opposite to one another. By way of example, if the microporous membrane is cut at an angle of about 45° at the slitting/rewinding station 20, then the relative angular bias as between the orientation of the membrane layers will be about 90°, even though the orientation of each membrane layer are at an angle of 45° relative to the elongate axis of the laminated membrane.

Lamination of the microporous membrane layers to form the separator according to this invention may be accomplished using heat and pressure supplied by the nip rollers 22a. In this regard, the pressures applied between the nip rollers of between about 300 psi and 450 psi and roll surface temperatures of between about 110° C. and 140° C. have been found to be particularly suitable to bond polyethylene or polyethylene and polypropylene layers together at a line speed of between about 15 fpm and 50 fpm.

Alternatively, membrane lamination may be accomplished using an adhesive applied to the face of one or both of the layers by means of adhesive applicator 22b before they are brought into physical contact at nip 22a. Preferably the adhesive is sprayed onto the film faces by any conventional techniques such as air atomization, ultrasonic spray or the like, but it is anticipated that printing techniques such as gravure coating may also be practiced. Virtually any adhesive may be used that is compatible with the microporous membrane, the electrochemical cell environment in which the laminated separator is intended to be used, and the method of application. One such material that may be used is the commercially available water based ethylene vinyl acetate AirFlex 400 made by Air Products and Chemicals Inc., of Allentown, Pa. For spray application, care must be exercised so that the adhesive droplets deposited on the membrane faces do not mask or obscure the micropores of the membrane (i.e., so that adequate porosity and permeability is exhibited after lamination). In this regard, adhesive droplet sizes of between 1 and 100 microns and adhesive add-on of about 0.03 gm/ft$^2$ or less have been found to not adversely impact the porosity or permeability characteristics of the resulting laminated microporous battery separator sheet compared to a similar non-laminated sheet. This, of course, will depend upon the specific applicator used.

It is also anticipated that lamination of the plies could be accomplished by point (or line or pattern) bonding with heat and pressure or ultrasonics.

The cross-ply lamination, regardless of the technique employed, should preferably attain an interply adhesion of about 5 gm/in or greater to insure the plies do not delaminate during further processing. There is also some evidence that higher adhesion promotes higher puncture strength.

The cross-plied laminated sheet, now designated by reference numeral 24, exits the nip rolls 22a and may be slit in a lengthwise direction via knife blades 22c (only one of which is visible in FIG. 1) to form individual cross-plied microporous separator sheets 24a–24c which are wound into rolls 26a–26c respectively. The widthwise dimension of sheets 24a–24c is selected so as to be suitable for the battery cells in which the separator sheets are used. During manufacture of the battery cell, therefore, a roll of the separator sheets 26a–26c will be unwound and interposed between layers of the anode and cathode materials forming the battery cell. These juxtaposed anode, separator sheet and cathode layers will then be cut to desired length and spirally or serpentinely folded so as to be inserted within the external housing (called a "can" in art parlance) of the battery.

Accompanying FIG. 2 schematically depicts an exemplary battery cell BC in which a cross-plied separator sheet 24a according to this invention is employed. As is seen the battery cell BC includes anode and cathode layers 30, 32, respectively, between which continuous lengths of separator sheets 24a are interposed. This composite structure is spirally wound about a centrally located mandrel (not shown) so as to form a generally cylindrical cell 34 which is housed within can 36. It will be understood, however, that other geometric forms of the cell 34 are possible, such as a serpentine-shaped cell in which the anode, separator sheet and cathode layers 30, 24a and 32, respectively, are folded in a back-and-forth serpentine manner so as to fit within a generally rectangular-shaped can.

Electrical interconnection of the anode and cathode layer 30, 32 is accomplished with anode and cathode ribbon tabs 40, 42, respectively. In this regard, the cathode ribbon tab 42 is connected to the center pin 44a of cap 44. The anode ribbon tab 40, on the other hand, is connected to the exterior periphery of the cap 44 and thus is electrically connected through the can 36 to the anode pin (not shown) at an opposite end of the cap 44. An insulating disc 46 prevents short-circuiting from occurring between the anode and cathode ribbon tabs 40, 42.

The cross-plied separator sheets according to this invention preferably has a thickness of no greater than about 3 mils, most preferably 0.5 to 1.5 mil (thickness, however, maybe be greater if the specific application requires such), and permeability characteristics of less than about 45 sec-in$^2$ as measured with a high pressure Gurley Densometer available from Teledyne Gurley, Troy, N.Y. (hereinafter referred to as "Gurley Values"). Thus, the cross-plied laminated separator sheets according to this invention will have a thickness dimension which is less than about 0.2 mil greater than the thickness of a non-bonded laminate, and Gurley Values of less than about 10 sec-in$^2$ greater than the Gurley Values of a nonbonded laminate. The cross-plied separator according to this invention may, for example, exhibit a puncture strength of greater than about 350 gm for a thickness of about 1 mil.

Further aspects and advantages of this invention will become more clear after careful consideration is given to the following non-limiting examples.

EXAMPLES

The following tests were employed to obtain the data appearing in the Tables:

Gurley Value

This value is measured using a Model 4120 or 4150 Gurley Densometer from Teledyne Gurley, and is the time in seconds required to pass 10 cc of air through 1 in$^2$ of membrane at a constant pressure of 12.2 in of water. [Ref. ASTM D726 (B)]

Puncture Strength

Ten measurements are made across the width of the laminated product and averaged. A Mitech Stevens LFRA Texture Analyzer is used for the test. The needle is 1.65 mm in diameter with a 0.5 mm radius tip. The rate of descent is 2 mm/sec and the maximum amount of deflection is 6 mm. The film is held taut in a clamping device with a central opening 11.3 mm in diameter.

Example 1

A commercially available semi-crystalline polyethylene resin, Hostalen GF7750VL, was melt extruded through an annular die and quenched with air to make a tubular film which was collapsed and wound on a take-up roll. The extrusion and quench conditions were such that the film had some machine direction orientation and a stress induced row lamellar crystalline structure. The film was subsequently annealed to increase the size of the lamella. It was then cold stretched in the longitudinal or machine direction at room temperature to break open the areas between the lamella, hot stretched in the same direction to open the areas between the lamella to form tortuous micropores through the film, and finally heat set to control shrinkage. The resulting microporous membrane had a high degree of orientation in the machine direction.

The flat microporous membrane tube was then spirally slit. The tube was reopened by air and/or mechanical means (mandrel) and rotated about its axis while being slit by a cutting device set at some angle between parallel and perpendicular to the axis of rotation (typically 45°). The resulting single ply flat sheet product was wound onto a roll which had its axis perpendicular to the direction of cutting. It should be noted-that, prior to slitting, the direction of orientation was the same as the longitudinal or machine direction which was along the axis of the tube. After spiral slitting, the direction of orientation was at some angle to the "new" machine direction, the angle being defined by the angle of the cutter to the axis of the tube and the take-up.

Two rolls of the spirally slit microporous membrane product were then laminated together such that the directions of orientation criss-crossed (approximately perpendicular) in a cross-ply configuration. These were bonded at about 15 fpm using at hot nip with a temperature of about 110°–120° C. and a pressure of 300–350 psi. As shown in Table 1 below, the resulting product had significantly higher puncture strength compared to the two ply product in which the orientation of the layers were not biased with respect to one another. For comparison, the commercially available Celgard® 2400 Polypropylene Microporous Membrane has a thickness of about 1 mil, a Gurley value of between 20 to 45 sec-in², and a puncture strength of about 350 gm.

TABLE 1

|  | One Ply | Two Ply | Cross-Ply |
| --- | --- | --- | --- |
| Thickness (mil) | 0.50 | 1.02 | 1.0 |
| Gurley (sec-in²) | 8 | 14 | 17 |
| Puncture strength (gm) | 212 | 334 | 533 |

Example 2

Another cross-plied laminate was prepared as in Example 1 except that the laminate was bonded using a commercially available water-based EVA adhesive (AirFlex 400 from Air Products and Chemicals, Co. of Allentown, Pa.) which was sprayed on the face of one ply using an air atomizing spray nozzle. Care was taken to apply enough adhesive to bond the plies sufficiently to prevent delamination during later process, but without a significant increase in thickness or decrease in porosity. As show in Table 2 below, the resulting product had significantly higher puncture strength compared to the two ply product in which the orientation of the layers were not biased with respect to one another.

TABLE 2

|  | One Ply | Two Ply | Cross-Ply |
| --- | --- | --- | --- |
| Thickness (mil) | 0.49 | 1.02 | 1.12 |
| Gurley (sec-in²) | 14 | 22 | 29 |
| Puncture strength (gm) | 212 | 392 | 510 |

Example 3

A series of samples demonstrating the effect of bias angle and bonding were prepared with another polyethylene membrane and bonding process similar to those of Example 1. As shown in Table 3 below, the puncture strength increases with the angle of bias and bonding.

TABLE 3

|  | Bonded | Angle | Thickness (mil) | Gurley (sec-in²) | Puncture Strength (gm) |
| --- | --- | --- | --- | --- | --- |
| One Ply |  |  | 0.45 | 9 | 175 |
| Two Ply | No | 0° | 0.94 | 14 | 253 |
| " | Yes | 0° | 0.94 | 15 | 305 |
| " | No | 45° | 0.90 | 12 | 363 |
| " | Yes | 45° | 0.89 | 12 | 395 |
| " | No | 90° | 0.96 | 11 | 426 |
| " | Yes | 90° | 0.87 | 11 | 476 |

Example 4

A series of polyethylene and polypropylene/polyethylene laminates were made with a thickness of about 1 mil. As shown in Table 4, the puncture strength increases with the angle of bias and the use of polyproplyene as one of the plies.

TABLE 4

| Orientation | 0° | 45° | 90° |
| --- | --- | --- | --- |
| PE/PE | 330 gm | 390 gm | 456 gm |
| PP/PE | 370 gm | 570 gm | 950 gm |

Example 5

A series of samples were made to examine the effect of two types of spray applicators and particle size. One was an air atomizing nozzle which produced about 20 to 100 micron droplets (Spraying Systems Nozzle #E802, setup-¼ JSFU2C, spray pattern-flat, nozzle orientation-horizontal, distance to web-22 inches, orientation to web—45°, air pressure-30 psi, line speed-50 fpm). However, it is believed the smaller droplets were dispersed in the air before contacting the face of the membrane due to overspray and bounce back caused by the high velocity air stream producing and directing the spray. The other was an ultrasonic nozzle which produced about 1 to 100 micron droplets. It is believed the distribution was weighted toward the smaller sizes, and that most of the material contacted the membrane face due to the more gentle air stream directing the spray. As shown in Table 5, smaller droplet sizes appear to negatively affect the Gurley values.

TABLE 5

| Nozzle | Add-on (mg/cm²) | Gurley Value Increase |
| --- | --- | --- |
| Air Atomizing | 0.16 | 0% |
| Air Atomizing | 0.18 | 0% |
| Ultrasonic | 0.03 | 32% |
| Ultrasonic | 0.06 | 150% |

Example 6

A series of samples, made by air atomizing the adhesives (Spraying Systems Nozzle #E831, nozzle setup—¼TT650017, spray pattern-flat, nozzle orientation-vertical, distance to web-8 inches, orientation to web—90°, liquid flow rate-0.012–0.015 gpm, air pressure—10 psi, line speed-40 fpm), were made to show the effect of adhesive add-on Gurley values. As shown in Table 6, adhesive add-on can have a dramatic effect on Gurley values.

TABLE 6

| Adhesive Add-on Weight (gm/ft²) | Gurley Value (sec-in²) |
| --- | --- |
| 0.0 | 12 |
| 0.03 | 18 |
| 0.06 | 64 |
| 0.08 | 115 |

EXAMPLE 7

A series of examples were made to show the effect of orientation and thickness on puncture strength. The plies set forth below are polyethylene and made in accordance with the procedures set forth in Example 1. None of multiply examples are bonded. As shown in Table 7, orientation and thickness have an effect on puncture resistance.

TABLE 7

| Plies | Thickness (mil) | Orientation | Puncture strength (gm) |
|---|---|---|---|
| 1 | 1 | | 300 |
| 2 | 2 | Parallel (0°) | 440 |
| 2 | 2 | 45° | 588 |
| 2 | 2 | 90° | 743 |
| 1 | 0.6 | | 187 |
| 2 | 1.2 | Parallel (0°) | 357 |
| 2 | 1.2 | 90° | 501 |
| 1 | 0.45 | | 187 |
| 2 | 0.9 | Parallel (0°) | 265 |
| 2 | 0.9 | 90° | 422 |

The data above demonstrate that significantly stronger microporous membrane separator sheets may be provided in accordance with the principles of this invention without significant increase in the thickness and/or permeability characteristics as compared to a single ply microporous membrane separator sheet. That is, the cross-plied microporous membrane separator sheets according to this invention exhibit increased strength as compared to two-ply separators having their orientation in the same direction. As a result, the separator sheets of this invention are particularly useful for battery cell constructions which require continuous seamless separator sheets such as in cylindrical or prismatic battery cells in which the internal anode, cathode and interposed separator sheet layers are spirally wound or accordion folded, respectively.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrochemical battery comprising anode and cathode sheets, and a continuous cross-plied microporous battery separator interposed between said anode and cathode sheets, the battery separator comprising; a continuous first ply of uniaxially oriented, microporous polymeric material; and a continuous second ply of uniaxially oriented, microporous polymeric material, wherein said first and second plies are adhered to one another in face-to-face contact such that the uniaxial orientation of said first ply is at an angle relative to the uniaxial orientation of said second ply so as to form an axially seamless continuous battery separator.

2. The battery as in claim 1, wherein the first and second plies are in contact with one another such that the uniaxial orientation of the first ply is at an angle of between 20° to 90° relative to the uniaxial orientation of the second ply.

3. The battery as in claim 1, wherein, each of said first and second plies are formed of a polyolefin.

4. The battery as in claim 3, wherein said polyolefin is one of polyethylene and polypropylene.

5. The battery as in claim 1, wherein opposing faces of said first and second plies are adhered to one another.

6. The battery as in claim 5, wherein said first and second plies are adhered to one another by adhesive or hot nip bonding.

7. A method of making a battery cell having an anode sheet, a cathode sheet and a separator sheet interposed therebetween, said method comprising the steps of:

(a) providing a roll of cross-plied separator sheet having first and second plies of uniaxially oriented, microporous membranes wherein the uniaxial orientation of said first membrane is angularly biased relative to the uniaxial orientation of said second membrane;

(b) interposing said cross-plied separator sheet between continuous lengths of the anode and cathode sheets so as to form an internal battery cell composite structure;

(c) rolling or folding said internal battery cell composite structure; and then (d) placing said rolled or folded internal battery cell composite structure into an external battery cell housing.

* * * * *